(12) United States Patent
Guenter et al.

(10) Patent No.: US 9,760,819 B2
(45) Date of Patent: Sep. 12, 2017

(54) ENCODING AND DECODING DATA IN TWO-DIMENSIONAL SYMBOLOGY

(71) Applicant: International Business Machines Corporation, Armonk, NY (US)

(72) Inventors: Erich Guenter, Hofheim (DE); Mark E. Maresh, Wake Forest, NC (US); Colm Nolan, Meath (IE); Juan F. Vargas, Rochester, MN (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/967,596

(22) Filed: Dec. 14, 2015

(65) Prior Publication Data

US 2017/0169322 A1    Jun. 15, 2017

(51) Int. Cl.
    *G06K 19/06*    (2006.01)

(52) U.S. Cl.
    CPC . *G06K 19/06103* (2013.01); *G06K 19/06037* (2013.01)

(58) Field of Classification Search
    CPC ............ G06K 19/06103; G06K 19/06037
See application file for complete search history.

(56) References Cited

U.S. PATENT DOCUMENTS

| | | |
|---|---|---|
| 2002/0020747 A1 | 2/2002 | Wakamiya et al. |
| 2007/0299896 A1 | 12/2007 | Bjorklund et al. |
| 2009/0200386 A1 | 8/2009 | Longacre, Jr. |
| 2010/0078480 A1* | 4/2010 | Aker ............... G06K 19/06009 235/462.08 |
| 2010/0172538 A1 | 7/2010 | Rhoads |
| 2013/0001313 A1* | 1/2013 | Denniston, Jr. .... G06K 7/10722 235/472.03 |
| 2013/0279822 A1 | 10/2013 | Strom |

FOREIGN PATENT DOCUMENTS

| | | |
|---|---|---|
| EP | 1179805 A2 | 7/2001 |
| WO | 9622578 A1 | 7/1996 |
| WO | 2012123969 A2 | 9/2012 |

OTHER PUBLICATIONS

M.J.Fernandez-Getino Garcia, et al., "Joint 2D-Pilot-Symbol-Assisted-Modulation and Decision-Directed Frequency Synchronization Schemes for Coherent OFDM", IEEE Proceedings, Acoustics, Speech and Signal, vol. 5, 2000, pp. 1-4.

* cited by examiner

*Primary Examiner* — Thien M Le
*Assistant Examiner* — Asifa Habib
(74) *Attorney, Agent, or Firm* — Cantor Colburn LLP; Damion Josephs

(57) ABSTRACT

Examples of techniques for encoding data in a 2D symbology are disclosed. In one example implementation according to aspects of the present disclosure, a computer-implemented method for encoding data in a 2D symbology is provided. The method comprises assigning a first indicium representative of a 0-bit and a second indicium representative of a 1-bit, designating a starting indicator, and generating, by a processing device, the 2D symbology including a unit array defining a bit length and a plurality of bit arrays.

20 Claims, 8 Drawing Sheets

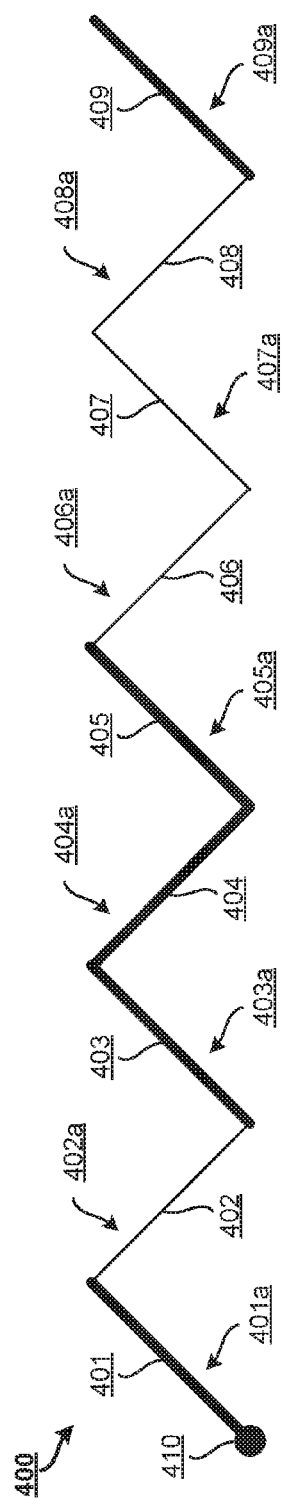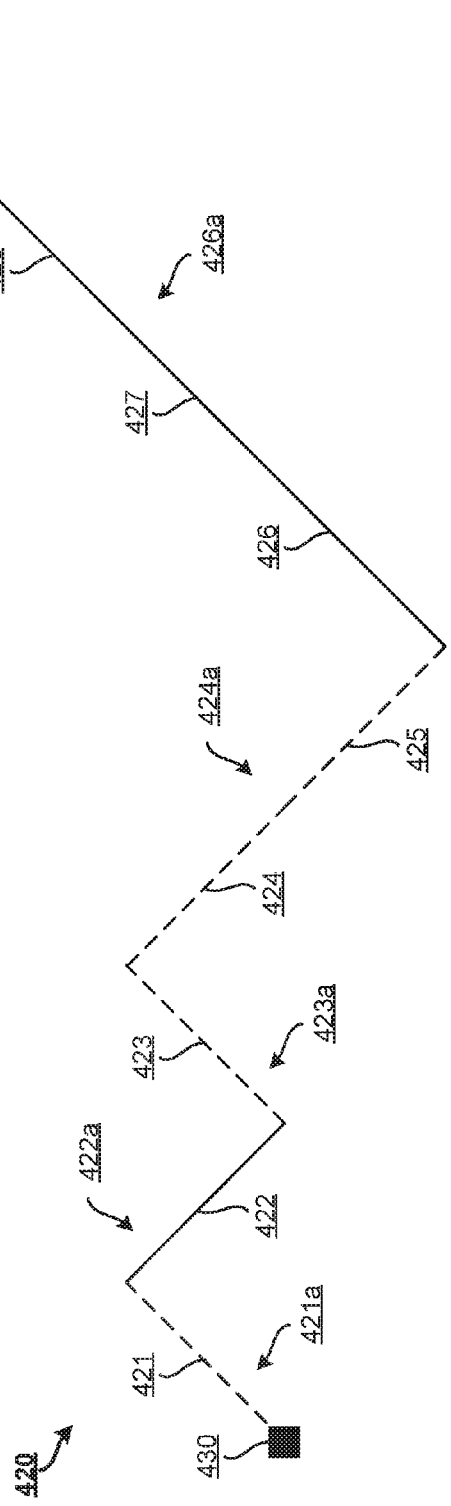

ENCODING AND DECODING DATA IN TWO-DIMENSIONAL SYMBOLOGY

BACKGROUND

The present disclosure relates to two-dimensional (2D) symbology, and more particularly, relates to techniques for encoding and decoding data in two-dimensional symbology.

A 2D symbology is a two-dimensional representation of information. A 2D symbology (e.g., Data Matrix codes) can be read by an imaging device (such as a camera, scanner, etc.) and information contained within the 2D symbology can be decoded. Some current 2D symbologies encode data that is readable and decodable by processing systems but most existing 2D symbologies are not able to convey useful information to a human without being decoded by the processing system. In addition, some current 2D symbologies have rigid spatial, size, orientation, and/or layout requirements, providing little flexibility in their presentation. Examples of some existing 2D symbologies include Data Matrix codes, Quick Response (QR) codes, Aztec codes, Semacodes, PDF417 codes, and various other matrix codes.

SUMMARY

In accordance with aspects of the present disclosure, a computer-implemented method for encoding data in a 2D symbology is provided. The method comprises assigning a first indicium representative of a 0-bit and a second indicium representative of a 1-bit. The method further comprises designating a starting indicator. The method also comprises generating, by a processing device, the 2D symbology, the 2D symbology comprising a unit array defining a bit length and a plurality of bit arrays. The unit array extends in a first direction from the starting indicator. The plurality of bit arrays are positioned in an end-to-end layout extending from an end of the unit array and ending at an end of a bit array being surrounded by a blank space. Each of the plurality of bit arrays comprise at least one bit indicator, the at least one bit indicator being one bit length long and indicating a bit of a binary string. A first bit array of the plurality of bit arrays is in a second direction different from the first direction. The 0-bits of the binary string are indicated by bit indicators being of the first indicium and the 1-bits of the binary string are indicated by bit indicators being of the second indicium.

In accordance with additional aspects of the present disclosure, a system for encoding data in a 2D symbology is provided. The system comprises a processor in communication with one or more types of memory. The processor is configured to assign a first indicium representative of a 0-bit and a second indicium representative of a 1-bit. The processor is further configured to designate a starting indicator. The processor is also configured to generate the 2D symbology, the 2D symbology comprising a unit array defining a bit length and a plurality of bit arrays. The unit array extends in a first direction from the starting indicator. The plurality of bit arrays are positioned in an end-to-end layout extending from an end of the unit array and ending at an end of a bit array being surrounded by a blank space. Each of the plurality of bit arrays comprise at least one bit indicator, the at least one bit indicator being one bit length long and indicating a bit of a binary string. A first bit array of the plurality of bit arrays is in a second direction different from the first direction. The 0-bits of the binary string are indicated by bit indicators being of the first indicium and the 1-bits of the binary string are indicated by bit indicators being of the second indicium.

In accordance with yet additional aspects of the present disclosure, a computer program product for encoding data in a 2D symbology is provided. The computer program product comprises a non-transitory storage medium readable by a processing circuit and storing instructions for execution by the processing circuit for performing a method. The method comprises assigning a first indicium representative of a 0-bit and a second indicium representative of a 1-bit. The method further comprises designating a starting indicator. The method also comprises generating the 2D symbology, the 2D symbology comprising a unit array defining a bit length and a plurality of bit arrays. The unit array extends in a first direction from the starting indicator. The plurality of bit arrays are positioned in an end-to-end layout extending from an end of the unit array and ending at an end of a bit array being surrounded by a blank space. Each of the plurality of bit arrays comprise at least one bit indicator, the at least one bit indicator being one bit length long and indicating a bit of a binary string. A first bit array of the plurality of bit arrays is in a second direction different from the first direction. The 0-bits of the binary string are indicated by bit indicators being of the first indicium and the 1-bits of the binary string are indicated by bit indicators being of the second indicium.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

FIGS. 4A and 4B illustrate two-dimensional symbologies according to examples of the present disclosure;

DETAILED DESCRIPTION

Various implementations are described below by referring to several examples of encoding and decoding data in two-dimensional symbologies. To encode and decode data in a 2D symbology, the present techniques utilize bit arrays that can shape into a human-recognizable character, word, shape, or image or can form a graphical design. Each of the bit arrays comprise at least one bit indicator, and each of the bit indicators is one bit length long. The bit length is defined by a unit array that extends in a first direction from a starting indicator. A first bit array following the unit array extends from the unit array in a direction different than the first direction of the unit array. Additional bit arrays may be used and may be of varying lengths that are multiples of the bit length. The additional bit arrays may also be in any direction.

In some implementations, the present techniques enable 2D symbology to be flexible in terms of spatial, size, orientation, and/or layout specifications. Moreover, the present techniques may enable a 2D symbology to be human-recognizable (e.g., text, a logo, a symbol, etc.). These and other advantages will be apparent from the description that follows.

Figure 1:
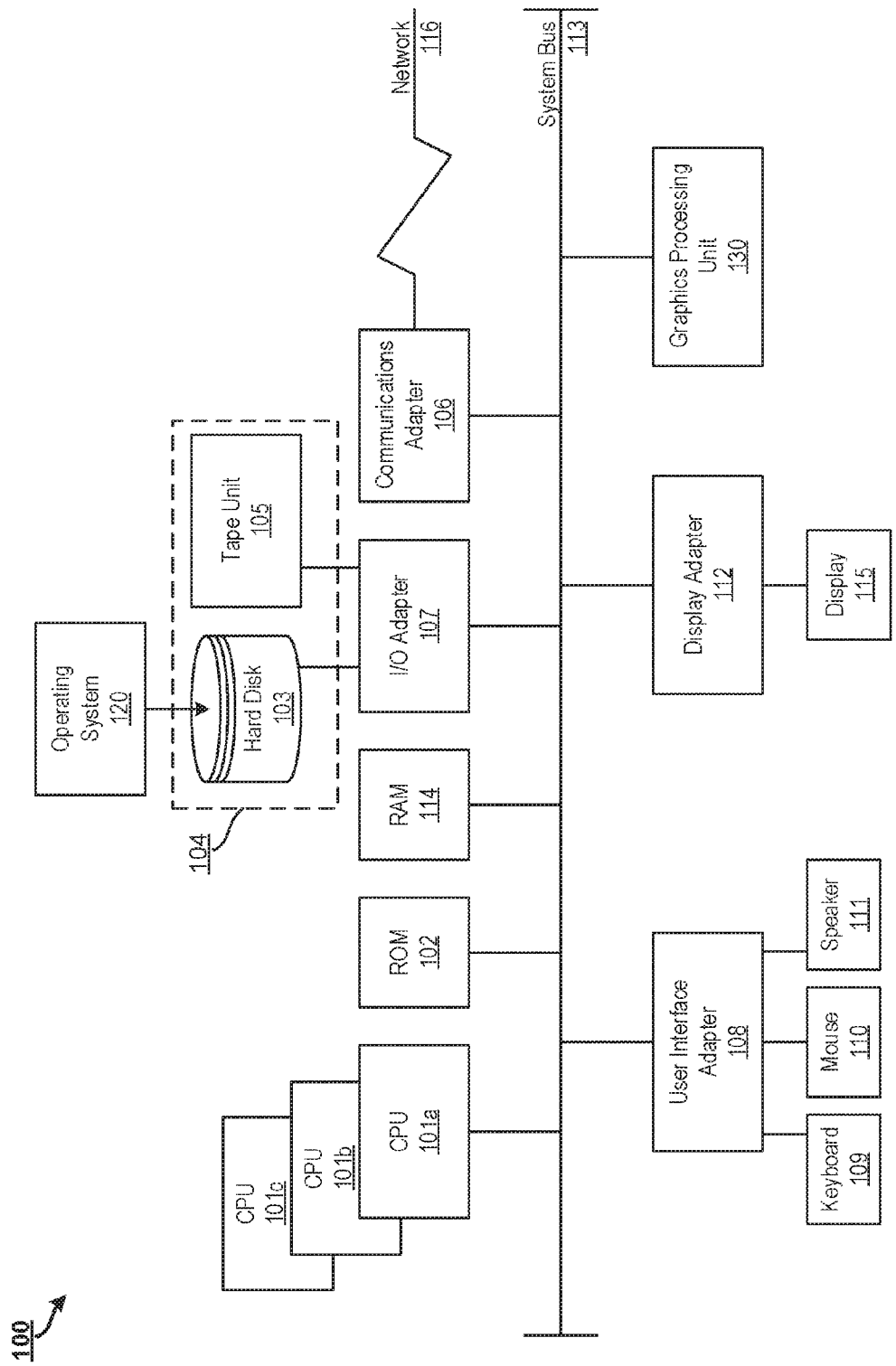
FIG. 1 illustrates a block diagram of a processing system for implementing the techniques described herein according to examples of the present disclosure.

FIG. 1 illustrates a block diagram of a processing system 100 for implementing the techniques described herein. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
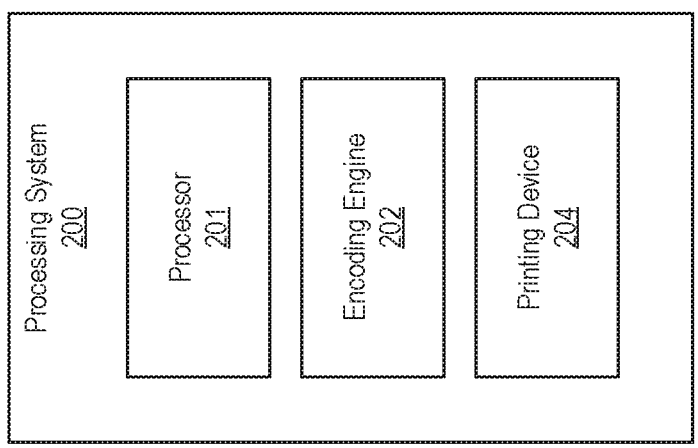
FIG. 2 illustrates a processing system for encoding data in two-dimensional symbology according to examples of the present disclosure.

FIG. 2 illustrates a processing system 200 for encoding data in two-dimensional symbology according to examples of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processors 101 implement the engines described herein. Other engines may also be utilized to include other features and functionality described in other examples herein.

Processing system 200 may include a processor 201, an encoding engine 202, and a printing device 204. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Encoding engine 202 enables the processing system 200 to encode data into a 2D symbology by assigning a first indicium to represent a 0-bit and a second indicium to represent a 1-bit in a binary string. For example, the color "blue" may be an indicium to represent a 0-bit and the color "red" may be an indicium to represent a 1-bit. In other examples, alternative colors may be used instead. In further examples, two different shades of the same color may be used to represent the different bits. In aspects of the present disclosure, other indicia may be used. For example, line weight (e.g., light line weight, medium line weight, heavy line weight, etc.) may be used to represent the bits of the binary string. Other suitable indicia, such as line style (e.g., dashed lines, dotted lines, solid lines, etc.), may also be implemented.

Encoding engine 202 also designates a starting indicator. The starting indicator may be a variety of shapes, such as a circle (e.g., starting indicator 410 of FIG. 4A), a square (e.g., starting indicator 430 of FIG. 4B), a triangle, or any other suitable shape or indicia. In examples, the starting indicator may be a solid shape, such as a solid circle. However, in other examples, the starting indicator may be an empty shape (i.e., a non-solid shape). In some examples, encoding engine 202 may also define an ending indicator to be used instead of the blank space surrounding the end of a bit array to indicate the end of the 2D symbology. The ending indicator may also be a variety of shapes. In examples, the ending indicator is the same shape as the starting indicator but is distinct from the starting indicator. For example, the starting indicator may be a solid circle and the ending indicator may be an empty circle.

Encoding engine 202 generates the 2D symbology, which includes a unit array and a plurality of bit arrays. The unit array defines a bit length, which may be any suitable length. The unit array extends in a first direction from the starting indicator. In examples, the unit array is representative of a 1-bit. This enables the unit array to make known to a decoding processing system which indicium is representative of a 1-bit and therefore that the remaining indicium is representative of a 0-bit. In other examples, the unit array is representative of a 0-bit instead.

Each of the plurality of bit arrays include at least one bit indicator that indicates a bit of a binary string. Each of the bit indicators are one bit length long. Consequently, each of the plurality of bit arrays comprising the bit indicators are a multiple of bit lengths long. The plurality of bit arrays is positioned in an end-to-end layout extending from an end of the unit array and ending at an end of a bit array being surrounded by a blank space. A first bit array of the plurality of bit arrays is in a direction different than the first direction from the unit array. In this way, the unit array defines the bit length. In various examples, the bit length may vary from one 2D symbology to another 2D symbology; however, within a 2D symbology, the bit length must remain constant.

The bit indicators of the plurality of bit arrays represent the bits of the binary string. For example, 0-bits of the binary string are indicated by bit indicators being of the first indicium and 1-bits of the binary string are indicated by bit indicators being of the second indicium. In this way, the bits of the binary string are encoded into the 2D symbology.

Printing device 204 prints the 2D symbology generated by encoding engine 202. For example printing device 204 may be a printer or other image creation device configured to print or otherwise display the 2D symbology. In examples, printing device 204 is a printer configured to print the 2D symbology on a physical medium such as paper. In other examples, printing device 204 is an electronic display configured to display the 2D symbology electronically.

Figure 3:
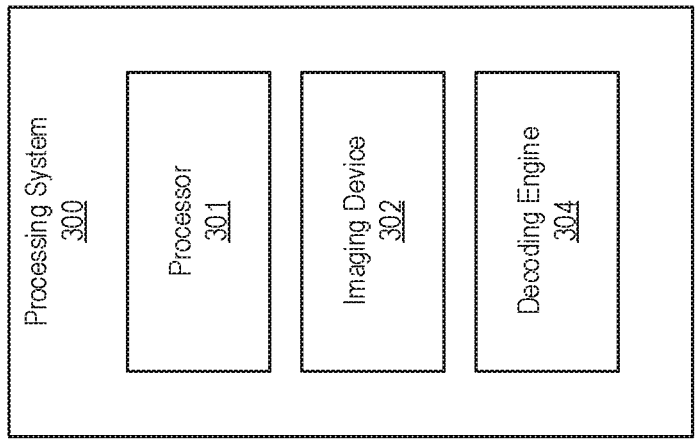
FIG. 3 illustrates a processing system for decoding data in two-dimensional symbology according to examples of the present disclosure.

FIG. 3 illustrates a processing system 300 for decoding data in two-dimensional symbology according to examples of the present disclosure. The various components, modules, engines, etc. described regarding FIG. 3 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processors 101 implement the engines described herein. Other engines may also be utilized to include other features and functionality described in other examples herein.

Processing system 300 may include a processor 301, an imaging device 302, and a decoding engine 304. Alternatively or additionally, the processing system 300 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Imaging device 302 captures an image of a 2D symbology. The 2D symbology comprises a unit array and a plurality of bit arrays starting with a starting indicator. The plurality of bit arrays each comprises at least one bit indicator that indicates 0-bits and 1-bits of a binary string. The 0-bits are represented by a first indicium and the 1-bits are represented by a second indicium. In examples, the imaging device 302 is a camera, scanner, or other device configured to capture an image, such as of a 2D symbology.

Decoding engine 304 recognizes the starting indicator. The starting indicator that the unit array is the next array, the unit array defining a bit length for the bit indicators of the bit arrays. The various examples of starting indicators are disclosed herein.

Decoding engine 304 then extracts the binary string from the 2D symbology by reading the unit array and each of the plurality of bit arrays that follow the starting indicator until the end of the 2D symbology. The bit indicators corresponding to a 0-bit are represented by the first indicium and bit indicators corresponding to a 1-bit are represented by the second indicium. In examples, once the starting indicator is recognized, the 2D symbology may be read by decoding engine 304. In particular, decoding engine 304 the unit array and each of the plurality of bit arrays after the starting indicator until decoding engine 304 reaches the end of the 2D symbology, which is represented by a specified blank space (a quiet zone). In examples, the quiet zone is sufficiently large to indicate the last bit array of the 2D symbology.

FIGS. 4A and 4B illustrate two-dimensional symbologies 400, 420 according to examples of the present disclosure. The 2D symbologies 400, 420 are each formed by a continuous line comprised of a unit array (e.g., array 401a, array 421a) and a plurality of bit arrays with no breaks or overlaps (i.e., intersects). The continuous line may be of any length and/or shape.

The continuous line is formed by arrays having one or more bit indicators. For example, the continuous line of 2D symbology 400 of FIG. 4A comprises arrays 401a, 402a, 403a, 404a, 405a, 406a, 407a, 408a, 409a. The continuous line of 2D symbology 420 of FIG. 4B comprises arrays 421a, 422a, 423a, 424a, 426a.

Each bit indicator may have associated with the bit indicator an indicium, which is representative of a bit of a binary string. For example, an indicium may represent a 0-bit or a 1-bit of the binary string. In the example of FIG. 4A regarding 2D symbology 400, 0-bits of a binary string are represented by bit indicators having a light line weight (e.g., bit indicators 402, 406, 407, 408), and 1-bits of the binary string are represented by bit indicators having a heavy line weight (e.g., bit indicators 401, 403, 404, 405, 409). Two-dimensional symbology 400 represents the binary string 101110001.

Similarly, in the example of FIG. 4B regarding 2D symbology 420, 0-bits of a binary string are represented by bit indicators having a solid line (e.g., bit indicators 422, 426, 427, 428), and 1-bits of the binary string are represented by bit indicators having a dashed line (e.g., bit indicators 421, 423, 424, 425, 429). In other examples, 0-bits may be represented by bit indicators colored a first color (e.g., red) while 1-bits may be represented by bit indicators colored a second color (e.g., blue). Two-dimensional symbology 420 represents the binary string 101110001.

The arrays of the continuous line forming 2D symbologies 400, 420 start at a starting indicator and end at an end of a bit array being surrounded by a blank space (i.e., when no further array continues and blank space is reached). For example, 2D symbology 400 starts at starting indicator 410. Similarly, 2D symbology 420 starts at starting indicator 430.

Starting indicators 410, 430 may be a variety of shapes, such as a circle (e.g., starting indicator 410), a square (e.g., starting indicator 430), a triangle, or any other suitable shape or indicia. For example, starting indicator 410 is a circle. Similarly, 2D symbology 420 uses a solid square (e.g., starting indicator 430) to indicate the start of 2D symbology 420. Other indicia may be utilized to indicate starting indicators.

In aspects of the present disclosure, starting indicators 410, 430 may provide additional information to a decoding processing system (e.g., processing system 300 of FIG. 3). For example, the starting indicators may include additional logic. For example, a solid circle may be used to represent one type of encoding (e.g., 4-bit encoding) while an empty circle may be used to represent another type of encoding (e.g., 8-bit encoding). In examples, the logic may be certain encryption rules, bit-encoding schemes to binary encode data. For example, the starting indicators can define encoding schemes for the binary symbol (e.g., 4-bit encoding, 6-bit encoding, 8-bit encoding, etc.). In the example of FIG. 4A, starting indicator 410 (e.g., the solid circle) may indicate that 2D symbology is encoded using a 4-bit encoding scheme. In the example of FIG. 4B, starting indicator 430 (e.g., the solid square) may indicate that 2D symbology is encoded using an 8-bit encoding scheme.

A unit array may immediately follow the starting indicator. For example, unit array 401a (which comprises bit indicator 401) immediately follows starting indicator 410. Similarly, unit array 421a (which comprises bit indicator 420) immediately follows starting indicator 430. The unit array defines a bit length for each of the bit indicators in the arrays in the 2D symbology. For example, regarding 2D symbology 400, each of the bit indicators 401-409 are of the same array length as defined by unit array 401a. Each of the bit arrays in a 2D symbology are to be of a length substantially equal to, or a multiple of a length substantially equal to, the bit length defined by the unit array.

For example, array 424a of 2D symbology 420 of FIG. 4B comprises two bit indicators 424, 425. The length of array 424a a multiple (2×) of the bit length defined by unit array 421a. Similarly, array 426a of 2D symbology 420 of FIG. 4B comprises four bit indicators 426-429. The length of array 426a is a multiple (4×) of the bit length defined by unit array 421a.

Figure 5:
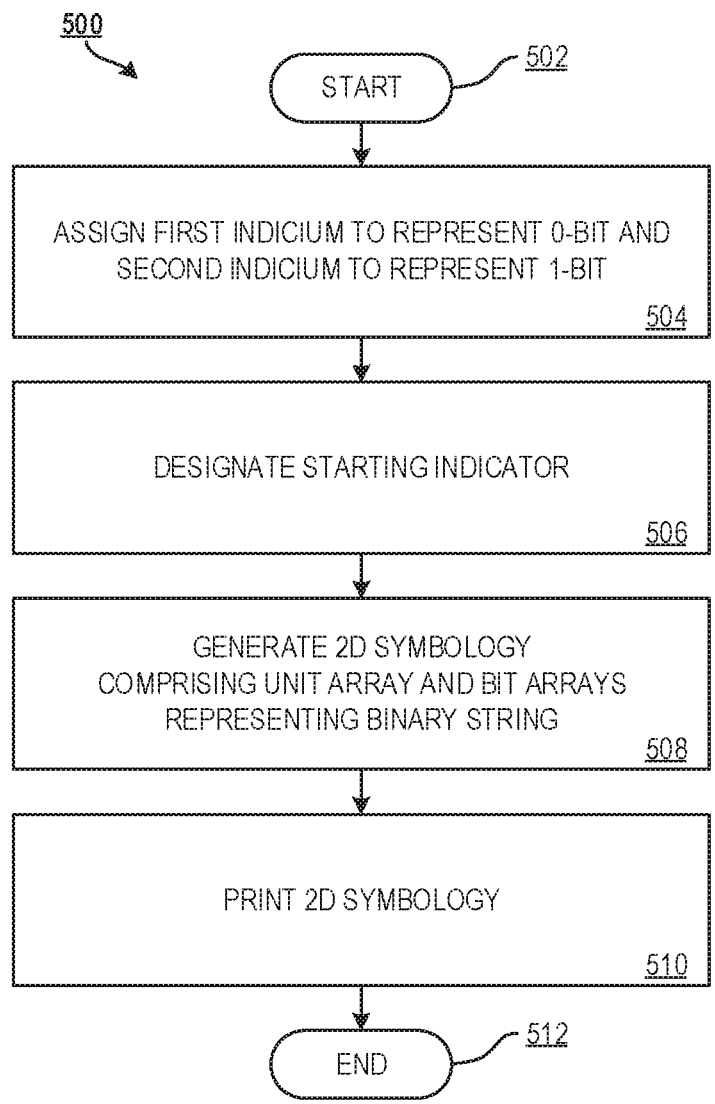
FIG. 5 illustrates a flow diagram of a method for encoding data in two-dimensional symbology according to examples of the present disclosure.

FIG. 5 illustrates a flow diagram of a method 500 for encoding data in two-dimensional symbology according to examples of the present disclosure. The method 500 begins at block 502 and continues to block 504.

At block 504, the method includes assigning a first indicium to represent a 0-bit and assigning a second indicium to represent a 1-bit. In examples, the first indicium is a first color and the second indicium is a second color. In other examples, the first indicium is a first line weight and the second indicium is a second line weight.

At block 506, the method 500 includes designating a starting indicator. In examples, the starting indicator is a solid symbol. The starting indicator may indicate an encoding scheme (e.g., 4-bit, 6-bit, 8-bit, etc.) and/or an encryption method.

At block 508, the method 500 includes generating the 2D symbology. The 2D symbology comprises a unit array and a plurality of bit arrays. The unit array defines a bit length and extends in a first direction from the starting indicator. The plurality of bit arrays are positioned in an end-to-end layout extending from an end of the unit array (i.e., the end not extending from the starting indicator). Each of the plurality of bit arrays comprises at least one bit indicator which is one bit length long and indicates a bit of a binary string. A first bit array of the plurality of bit arrays is in a second direction that is different from the first direction of the unit array. In this way, the change in direction between the unit array and the first bit array defines the bit length of the unit array. The 0-bits of the binary string are indicated by bit indicators that are the first indicium and the 1-bits of the binary string are indicated by bit indicators that are the second indicium. In examples, the unit array comprises a bit indicator.

In examples according to aspects of the present disclosure, the unit array and the plurality of bit arrays form a continuous line starting with the starting indicator. None of the unit array and the plurality of bit arrays interest with any of the other unit array and the plurality of bit arrays. The continuous line of unit arrays and bit arrays may form a human-recognizable layout, such as a letter, word, phrase, symbol, or other graphic image.

At block 510, the method 500 includes printing the 2D symbology. In examples, printing the 2D symbology includes printing the 2D symbology with a printing device such that the 2D symbology is applied to an article (e.g., a piece of paper, a box, packaging materials, etc.). In other examples, printing the 2D symbology includes displaying the 2D symbology on a display device. The method 500 continues to block 512 and terminates.

Additional processes also may be included, and it should be understood that the processes depicted in FIG. 5 represent illustrations, and that other processes may be added or existing processes may be removed, modified, or rearranged without departing from the scope and spirit of the present disclosure.

Figure 6:
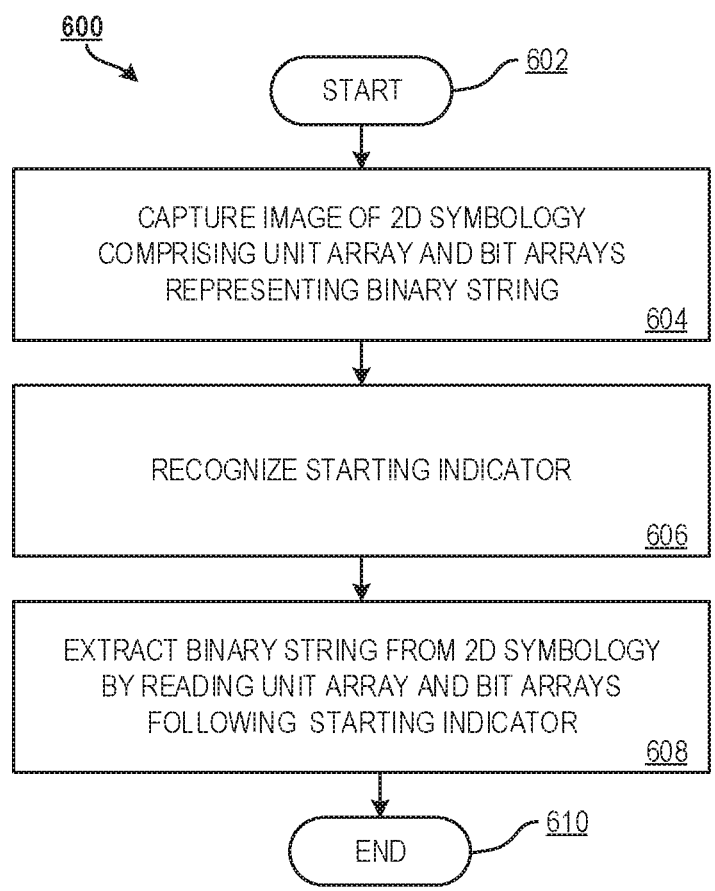
FIG. 6 illustrates a flow diagram of a method for decoding data in two-dimensional symbology according to examples of the present disclosure.

FIG. 6 illustrates a flow diagram of a method 600 for decoding data in two-dimensional symbology according to examples of the present disclosure. The method 600 begins at block 602 and continues to block 604.

At block 604, the method 600 includes capturing an image of a 2D symbology. The 2D symbology comprises a unit array and a plurality of bit arrays. The unit array defines a bit length and extends in a first direction from the starting indicator. The plurality of bit arrays are positioned in an end-to-end layout extending from an end of the unit array (i.e., the end not extending from the starting indicator) and ending at the end at an end of a bit array being surrounded by a blank space. Each of the plurality of bit arrays comprises at least one bit indicator which is one bit length long and indicates a bit of a binary string. A first bit array of the plurality of bit arrays is in a second direction that is different from the first direction of the unit array. In this way, the change in direction between the unit array and the first bit array defines the bit length of the unit array. The 0-bits of the binary string are indicated by bit indicators that are the first indicium and the 1-bits of the binary string are indicated by bit indicators that are the second indicium.

At block 606, the method 600 includes recognizing the starting indicator. Various configurations of starting indicators may be utilized as described herein.

At block 608, the method 600 includes extracting the binary string from the 2D symbology by reading each of the bit indicators of unit array and the plurality of bit arrays. Bit indicators corresponding to a 0-bit are of the first indicium and bit indicators corresponding to a 1-bit are of the second indicium. The method 600 continues to block 610 and terminates.

Additional processes also may be included, and it should be understood that the processes depicted in FIG. 6 represent illustrations, and that other processes may be added or existing processes may be removed, modified, or rearranged without departing from the scope and spirit of the present disclosure.

Figure 7:
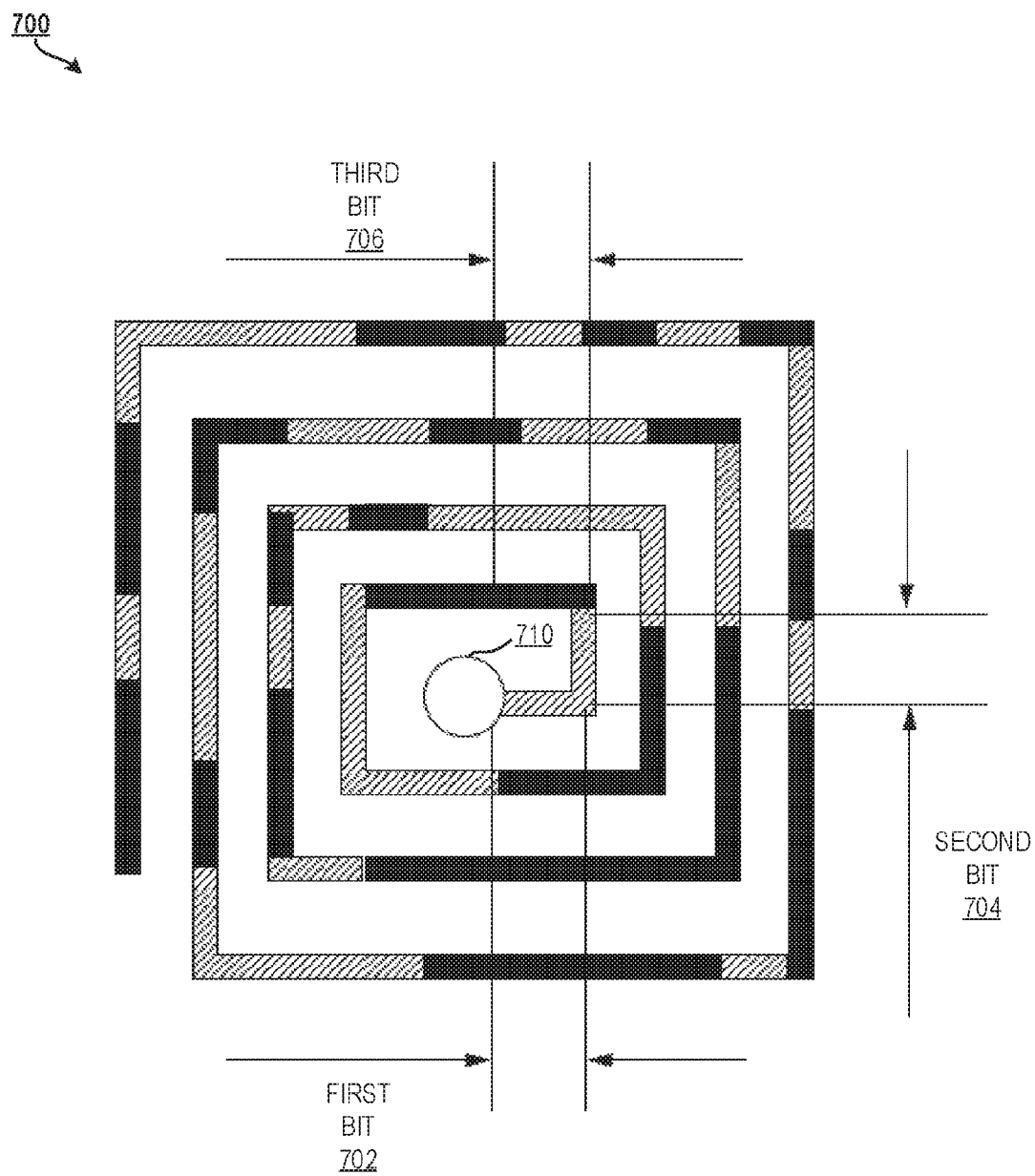
FIG. 7 illustrates a two-dimensional symbology according to examples of the present disclosure.

FIG. 7 illustrates a 2D symbology 700 according to examples of the present disclosure. The 2D symbology 700 starts with starting indicator 710 (e.g., an empty circle). In the present example, a first indicium (e.g., the hashed segment) may represent a 1-bit, while a second indicium (e.g., a solid segment) may represent a 0-bit.

A unit array extends from starting indicator 710 and includes a first bit 702 of the first indicium (e.g., first bit 702 is a 1-bit). The unit array extends from starting indicator 710 in a first direction.

A bit array extends from the unit array (first bit 702) in a second direction that is different from the first direction and includes a second bit 704 that is shown of the first indicium (e.g., second bit 704 is a 1-bit). A third bit array extends from the second bit array in a third direction that is shown different from the second direction and includes a third bit 706 that is shown of the second indicium (e.g., third bit 706 is a 0-bit).

The 2D symbology 700 continues as a continuous line of bit arrays until no further bit array is added and blank space is reached. It should be appreciated that each of the bit arrays of 2D symbology 700 are of a length equal to a multiple of the bit length as defined by the unit array containing first bit 702.

It is understood in advance that the present disclosure is capable of being implemented in conjunction with any other type of computing environment now known or later developed. In examples, the present disclosure may be implemented on cloud computing.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
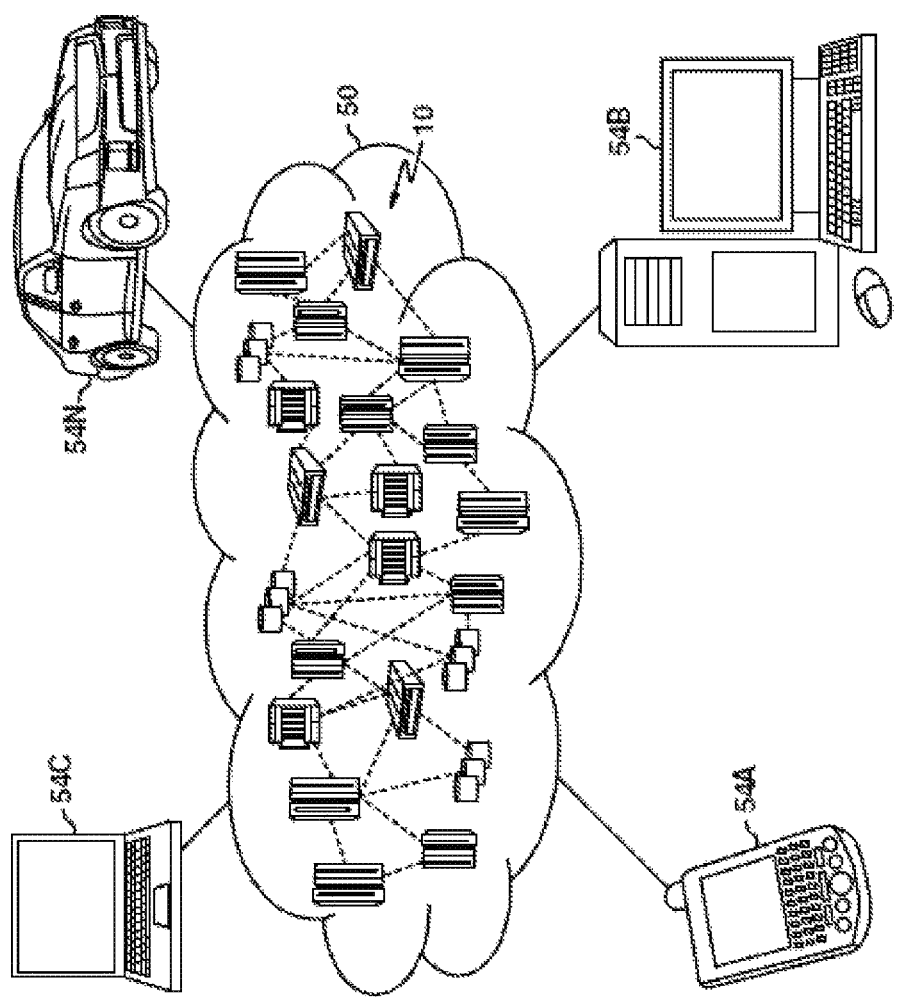
FIG. 8 illustrates a cloud computing environment according to examples of the present disclosure.

Referring now to FIG. 8, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
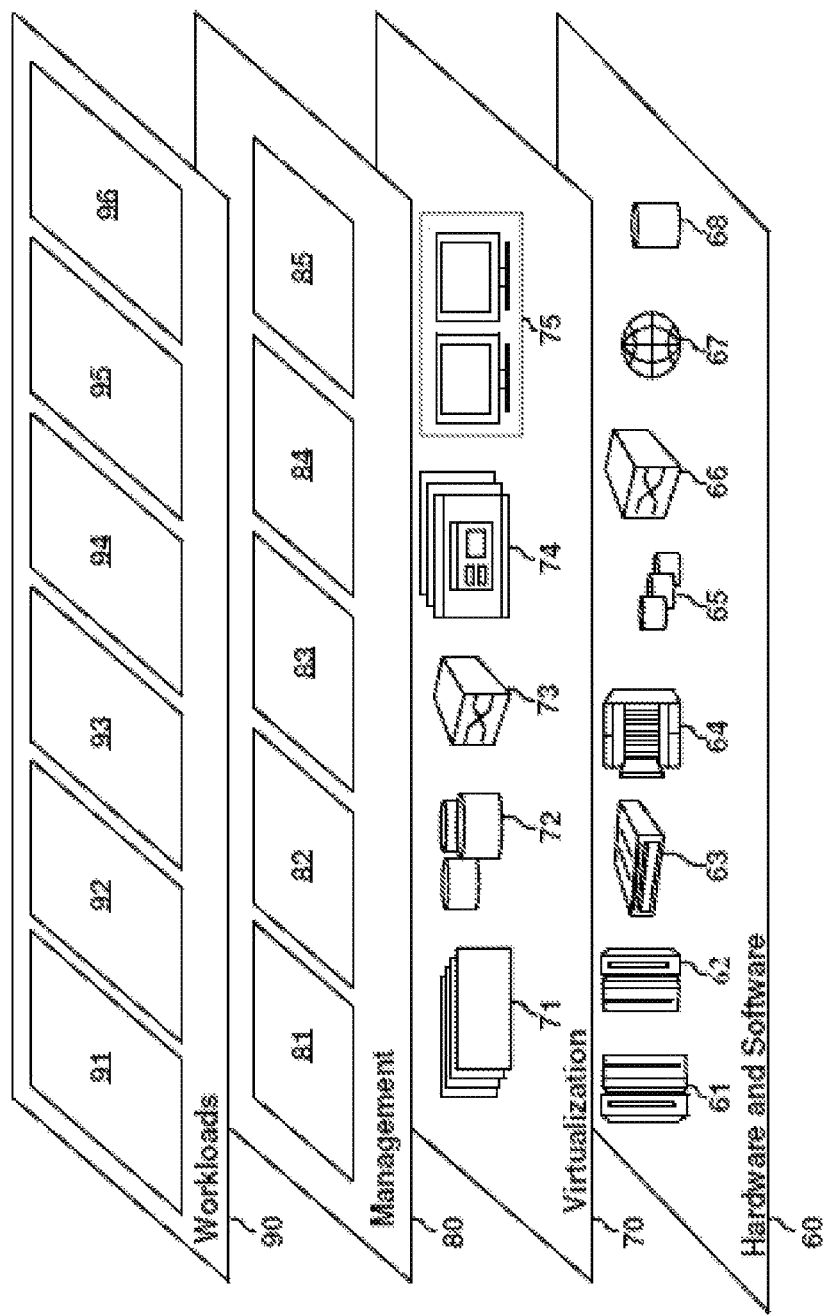
FIG. 9 illustrates abstraction model layers according to examples of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage of applications for mobile devices 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for encoding data in a two-dimensional (2D) symbology, the method comprising:
    assigning a first indicium representative of a 0-bit and a second indicium representative of a 1-bit;
    designating a starting indicator; and
    generating, by a processing device, the 2D symbology, the 2D symbology comprising a unit array defining a bit length and a plurality of bit arrays,
    wherein the unit array extends in a first direction from the starting indicator,
    wherein the plurality of bit arrays are positioned in an end-to-end layout extending from an end of the unit array and ending at an end of a bit array being surrounded by a blank space, each of the plurality of bit arrays comprising at least one bit indicator, the at least one bit indicator being one bit length long and indicating a bit of a binary string,
    wherein the unit array and the plurality of bit arrays form a continuous line starting with the starting indicator and ending at the end of the bit array being surrounded by the blank space,
    wherein a first bit array of the plurality of bit arrays is in a second direction different from the first direction, and
    wherein 0-bits of the binary string are indicated by bit indicators being of the first indicium and 1-bits of the binary string are indicated by bit indicators being of the second indicium.

2. The computer-implemented method of claim 1, wherein the starting indicator indicates an encoding scheme.

3. The computer-implemented method of claim 1, wherein the starting indicator indicates an encryption scheme.

4. The computer-implemented method of claim 1, wherein the first indicium is a first color and wherein the second indicium is a second color.

5. The computer-implemented method of claim 1, wherein the first indicium is a first line weight and wherein the second indicium is a second line weight.

6. The computer-implemented method of claim 1, wherein the first indicium is a first line style and wherein the second indicium is a second line style.

7. The computer-implemented method of claim 1, wherein the unit array comprises a bit indicator.

8. The computer-implemented method of claim 1, further comprising printing the 2D symbology.

9. The computer-implemented method of claim 1, wherein none of the unit array and the plurality of bit arrays intersect with any other of the unit array and the plurality of bit arrays.

10. The computer-implemented method of claim 9, wherein the unit array and the plurality of bit arrays form a human-recognizable layout.

11. A system for encoding data in a two-dimensional (2D) symbology, the system comprising:
    a processing device in communication with one or more types of memory, the processor configured to:
        assign a first indicium representative of a 0-bit and a second indicium representative of a 1-bit,
        designate a starting indicator, and
        generate the 2D symbology, the 2D symbology comprising a unit array defining a bit length and a plurality of bit arrays,
        wherein the unit array extends in a first direction from the starting indicator,
        wherein the plurality of bit arrays are positioned in an end-to-end layout extending from an end of the unit array and ending at an end of a bit array being surrounded by a blank space, each of the plurality of bit arrays comprising at least one bit indicator, the at least one bit indicator being one bit length long and indicating a bit of a binary string,
        wherein the unit array and the plurality of bit arrays form a continuous line starting with the starting indicator and ending at the end of the bit array being surrounded by the blank space, wherein a first bit array of the plurality of bit arrays is in a second direction different from the first direction, and wherein 0-bits of the binary string are indicated by bit indicators being of the first indicium and 1-bits of the binary string are indicated by bit indicators being of the second indicium.

12. The system of claim 11, wherein the starting indicator indicates an encoding scheme.

13. The system of claim 11, wherein the starting indicator indicates an encryption scheme.

14. The system of claim 11, wherein the first indicium is a first color and wherein the second indicium is a second color.

15. The system of claim 11, wherein the first indicium is a first line weight and wherein the second indicium is a second line weight.

16. The system of claim 11, wherein the first indicium is a first line style and wherein the second indicium is a second line style.

17. The system of claim 11, wherein the unit array comprises a bit indicator.

18. The system of claim 11, wherein none of the unit array and the plurality of bit arrays intersect with any other of the unit array and the plurality of bit arrays, and wherein the unit array and the plurality of bit arrays form a human-recognizable layout.

19. A computer program product for encoding data in a two-dimensional (2D) symbology, the computer program product comprising:

a non-transitory storage medium readable by a processing circuit and storing instructions for execution by the processing circuit for performing a method comprising:

assigning a first indicium representative of a 0-bit and a second indicium representative of a 1-bit, designating a starting indicator, and generating, by a processing device, the 2D symbology, the 2D symbology comprising a unit array defining a bit length and a plurality of bit arrays, wherein the unit array extends in a first direction from the starting indicator, wherein the plurality of bit arrays are positioned in an end-to-end layout extending from an end of the unit array and ending at an end of a bit array being surrounded by a blank space, each of the plurality of bit arrays comprising at least one bit indicator, the at least one bit indicator being one bit length long and indicating a bit of a binary string, wherein the unit array and the plurality of bit arrays form a continuous line starting with the starting indicator and ending at the end of the bit array being surrounded by the blank space, wherein a first bit array of the plurality of bit arrays is in a second direction different from the first direction, and wherein 0-bits of the binary string are indicated by bit indicators being of the first indicium and 1-bits of the binary string are indicated by bit indicators being of the second indicium.

20. The computer program product of claim 19, wherein none of the unit array and the plurality of bit arrays intersect with any other of the unit array and the plurality of bit arrays, and wherein the unit array and the plurality of bit arrays form a human-recognizable layout.

* * * * *